April 7, 1942.  W. ZAPP  2,278,505
VIEW FINDER FOR PHOTOGRAPHIC APPARATUS
Filed Jan. 9, 1939  2 Sheets-Sheet 1
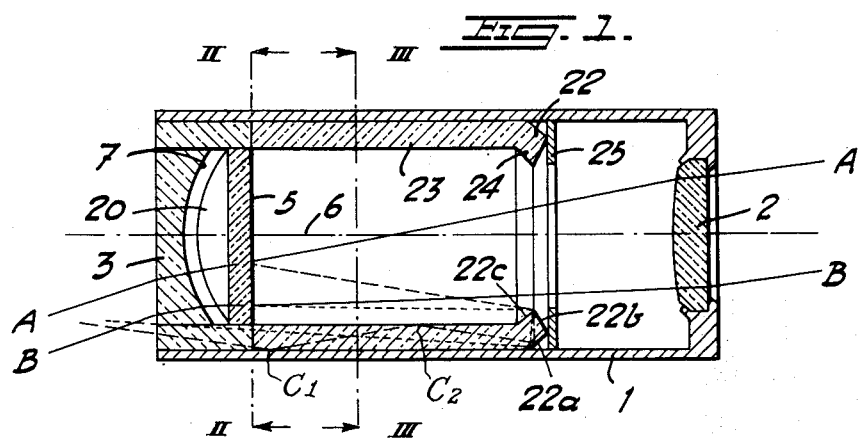
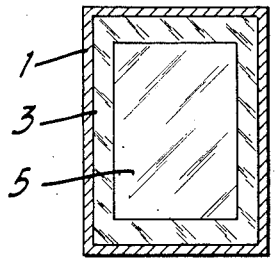 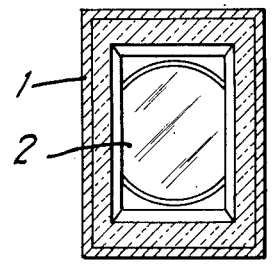
Inventor
Walter Zapp
By Sommers & Young
Attys

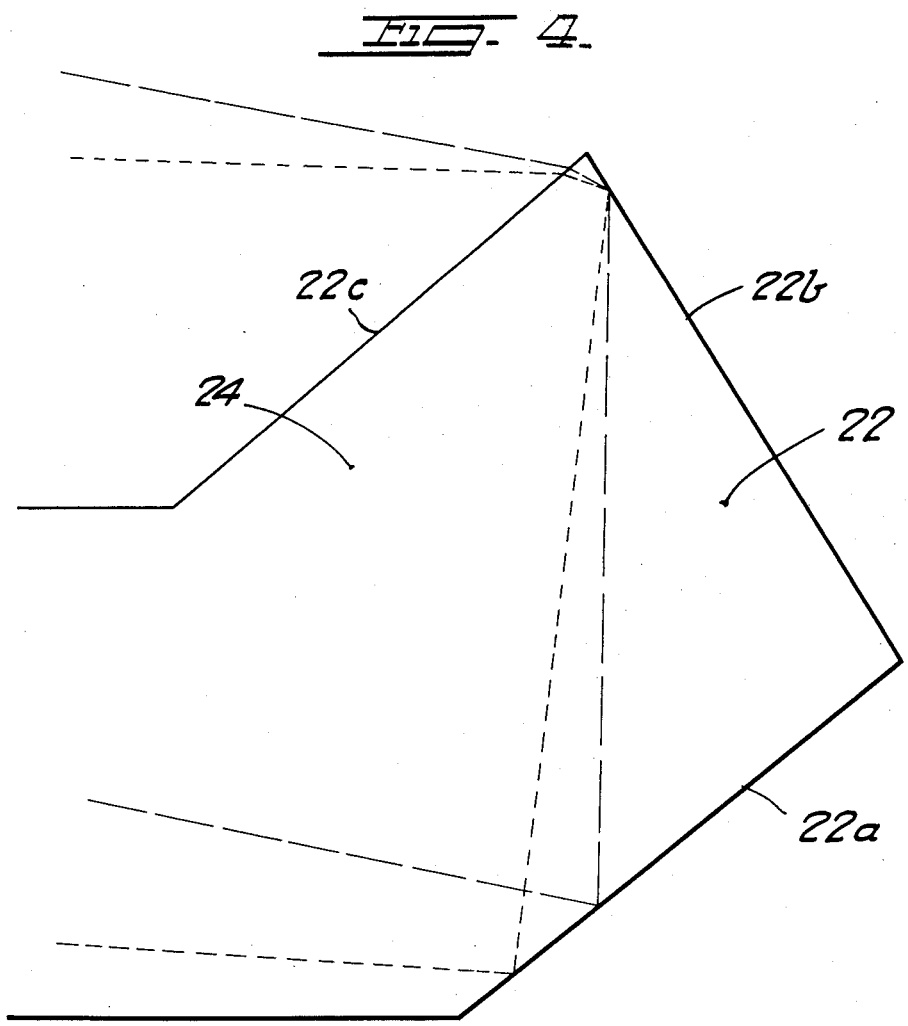

UNITED STATES PATENT OFFICE 2,278,505

VIEW FINDER FOR PHOTOGRAPHIC APPARATUS

Walter Zapp, Riga, Latvia, assignor to Valsts Elektrotechniska Fabrika, Riga, Latvia, a state company of Latvia Application January 9, 1939, Serial No. 250,048
In Sweden January 10, 1938

7 Claims. (Cl. 88—1.5)

The present invention relates to view-finders for photographic apparatus, more particularly to view-finders of the type in which the casing has a positive occular at the one end and a negative objective at the other end.

The invention has for its object to create an improved view-finder of this type in which the view seen through the ocular is surrounded or bounded by an illuminated frame-shaped surface or border.

Another object is to provide a view-finder in which the light-border surrounding the view-field is produced without the aid of additional windows or additional optical systems and which view-finder may be mounted within the body of the photographic apparatus, that is in such way, that no light need enter the casing of the view-finder laterally to product the light-border surrounding the view-field.

Another object of the invention is to construct the view-finder in such way that the view-finder may be used in all cases in which view-finders of the known Newton-type have heretofore been used.

Another object of the invention is to produce a view-finder in which the view is surrounded by an illuminated border the light-intensity of which always corresponds to the light-intensity of the view regardless of the character of the existing light.

Another object of the invention is to produce a view-finder in which the illuminated border or frame surrounding the view is especially bright and well defined.

Another object of the invention is to create a view-finder the dimensions of which in the lateral direction are especially small.

These and still further objects are attained in a manner which will be understood from the following description of the embodiment of the invention illustrated in the accompanying drawings.

In the construction of a view-finder in which said objects are attained, an important problem is the difficulty of supplying the illuminated border or frame with light in a satisfactory degree. In the view-finder according to the present invention this problem is solved in the following way: The light necessary for the illumination of the border or frame surface is supplied from the front opening through a tubular light-conducting element arranged concentrically in the tubular casing of the view-finder and comprising two concentric surfaces reflecting against each other. Near the ocular a frame-shaped reflecting member is arranged which directs the beams which have passed through the light-conducting channel, upon the frame or border surface. The light-conducting effect of said channel consists in that, contrary to the action of an air space bounded by non-reflecting walls, not only such light beams which pass from the entrance opening in a straight path through the space are used for illuminating the frame or border, but also such beams as enter the space at an inclined direction are, after reflection on the inner walls of the light-conducting channel and after reflection on said frame-shaped reflecting member, directed upon the surface on which the light frame or border is produced. If the light beams enter the light-conducting channel at small angles, they will fall upon the frame-shaped reflecting member only after a single reflection from one of the reflecting walls of the light-conducting channel, but when the light beams enter at greater angles, they will be reflected also against the second reflecting wall of said channel. Anyhow, the entire light falling upon the front opening will, independently of its angle of incidence and almost independently of the length of the channel in relation to its width, be supplied to the frame-shaped reflecting member and thus to the light frame or border, no light beams being cut off by the walls of the channel.

A further novel feature of the present view-finder consists in the special construction of the frame-shaped reflecting member, which construction with special advantages may be used in combination with said light-conducting channel. The surface on which the light frame or border is produced consists in well-known manner of a mirror, generally a transparent mirror. From this mirror the light is reflected towards the ocular. Different forms and profiles of the frame-shaped reflecting member producing the light frame or border have been proposed. In general, curved or straight surfaces at right angles or approximately at right angles to the optical axis of the view-finder have been used, which surfaces received the light laterally or in a direction from the objective and after single reflection directed it towards the objective. According to the present invention, however, the light passed through the light-conducting channel is received by a reflecting surface arranged behind the light-conducting element and inclined against the optical axis in such way that it reflects the light inwardly, substantially in the lateral direction, that is, transversely to the optical axis. Then the light is received by a second reflecting surface extending inwardly from the first one and arranged approximately at right angles to the same in such manner that the light is reflected once more, towards the objective and upon said transparent mirror, producing a light frame or border which then is seen through the occular. This double reflection gives the advantage that the light passing through the light-conducting channel is completely used for producing the light frame or border, the light by the first reflection being displaced inwardly in the transverse direction, so that it by the second reflection is directed past the wall of the light-conducting channel without being cut off by the same.

In the drawings:

Fig. 1 is a longitudinal section through the novel view-finder in one embodiment.

Fig. 2 is a cross-section taken on the line II—II of Fig. 1.

Fig. 3 is a cross-section taken on the line III—III of Fig. 1.

Fig. 4 illustrates, on a greater scale, the reflection of the rays for producing the illuminated border in Fig. 1.

Like reference numerals indicate corresponding parts throughout the several views.

In the embodiment shown in Figs. 1–3, the casing of the view-finder consists of a straight tube 1 having an oblong rectangular cross-section. This casing contains the optical elements of the view-finder, these elements also being of rectangular cross-section. At the one end of the casing is mounted the ocular 2 which consists of a plano-convex lens. At the other end of the casing is mounted the objective 3 which consists of a plano-concave lens. Preferably the internal surface 7 of the objective (the right surface in Fig. 1) is parabolic. Behind the objective, near the same, a transparent mirror 5 is arranged. This mirror preferably consists of a glass plate of the same size as the objective and is arranged in contact with the objective, this glass plate being provided with a transparent reflecting surface 20, produced for instance by a semi-transparent layer of silver or rhodium. In the embodiment shown this transparent reflecting surface is provided on the internal side of the glass plate (on the right side in Fig. 1) and is plane. However, it also may be provided on the external (left) side of the glass plate and may be slightly concave. The reference numeral 23 indicates the tubular light-conducting channel, which in this embodiment consists of a tube of a transparent material. The tube 23 is arranged concentrically in the casing and surrounds the mirror 5 and the objective 3. The outer end surface of the tube 23 (the left end in Fig. 1) preferably lies in the plane of the outer surface of the objective and constitutes a frame portion of the front opening of the objective. Said front end surface of the tube 23, which thus forms a light-admitting opening for illuminating the light border round the view, preferably is matted. The other, internal, end (the right end in Fig. 1) of the tube 23, which extends to a point near the ocular, consists, in the embodiment shown, of a frame 22 of transparent material preferably made in one piece with the tube 23. The cross-section or profile of the frame 22 is prismatic, presenting two inclined totally reflecting surfaces 22a and 22b for producing the light border. The surface 22a extends substantially behind the tube 23. The inner edge of the frame extends nearer the center of the tube 23 than the cross-section of this tube and is connected to the inner wall of the tube 23 by means of a portion 24 presenting a slanting surface 22c. A non-transparent disc 25 having a central opening is arranged to the right of the frame 22 (Fig. 1) in order to prevent the rays which may be refracted by the surfaces 22a and 22b from passing into the ocular 2. The optical axis has the reference numeral 6.

In Fig. 1 the passage of the rays is illustrated. The lines A—A and B—B indicate the course of two rays which start from a point at the circumference of the object. The object is supposed to be at infinity and, thus, these rays are parallel with each other. In passing through the objective 3 and the transparent mirror 5 the rays are deflected on account of refraction. Then the rays pass through the edge portions of the ocular 2 in which they are refracted once more in such way that after the passage through the ocular they are parallel again. The portions of the lines A—A and B—B which extend to the right of the reflecting surface 20 in Fig. 1 also indicate the course of the rays coming from the reflecting frame 22, after they are reflected by the surface 20.

Two other rays passing through the frame portions of the front opening into the tube 23 are indicated by dotted lines. One of these rays has a straight course in the tube 23 until it reaches the outer reflecting surface 22a of the frame 22. The other ray is totally reflected at two points C1 and C2 on the walls of the tube 23. Thus, the tube 23 serves as a light-conducting element. The reflection of the two rays is seen more clearly in Fig. 4. The two rays are totally reflected by the surface 22a of the prismatic frame and are directed to a common point on the inner reflecting surface 22b near the inner edge of the frame. Also at this point a total reflection occurs. At the surface 22c the two rays are refracted and now pass to the transparent reflecting surface 20 of the mirror 5. The mirror 5 reflects these rays and they are combined with the rays A—A and B—B coming from the object, and then they are refracted in the ocular. Thus, through the ocular an illuminated frame-shaped surface or light border is seen around the view of the object.

The objective produces a virtual image of the object which image is non-reversed in vertical as well as in lateral direction, and which through the ocular is seen as surrounded by a bright and well-defined light-frame or border. The light-border is reproduced by that portion of the mirror 5, which in the drawing is limited by the two lines A—A and B—B. Also the outer, boundary portions of the view-field extend over this area, for all the points of the object as well as of the light-border will present on this place a certain blur zone because the mirror 5 is not located in the focal plane of the ocular.

The distance between the ocular and the reflecting surface 20 and the distance between this surface and the reflecting frame 22 are of such dimensions that the reflecting frame 22 is in the focal plane of the ocular. Thus, the light-border produced by the reflecting frame 22, as well as the object are seen clearly and definitely through the ocular. Furthermore, the position of the light-border in relation to the view always will remain constant, independently of the position of the eye in relation to the ocular.

What I claim is:

1. In a view-finder for photographic apparatus, in combination, an opaque tubular casing, a negative objective at one end of said casing, a positive ocular at the other end of said casing, a transparent mirror located in said casing near the objective substantially at right angles to the axis of the view-finder, a frame-shaped reflecting member located in said casing near the ocular having totally reflecting surfaces which direct light to the margin of the mirror from a tubular light-conducting element arranged longitudinally in said casing and extending from the objective to the frame-shaped reflecting member, which tubular light-conducting element comprises parallel surfaces reflecting against each other.

2. In a view-finder for photographic apparatus, in combination, an opaque tubular casing, a negative objective at one end of said casing, a positive ocular at the other end of said casing, a transparent mirror located in said casing near the objective substantially at right angles to the axis of the view-finder, a frame-shaped reflecting member located in said casing near the ocular having totally reflecting surfaces which direct light to the margin of the mirror from a tubular light-conducting element arranged longitudinally in said casing and extending from the objective to the frame-shaped reflecting member, which light-conducting element consists of a tube of transparent material, the parallel surfaces of which are totally reflecting against each other.

3. In a view-finder for photographic apparatus, in combination, an opaque tubular casing, a negative objective arranged in said casing at one end of the same and forming the front opening of the view-finder, a positive ocular at the other end of said casing, a transparent mirror located in said casing near the objective substantially at right angles to the axis of the view-finder, a frame-shaped reflecting member located in said casing near the ocular having totally reflecting surfaces which direct light to the margin of the mirror from a tubular light-conducting element arranged longitudinally in said casing and extending from the front opening to the frame-shaped reflecting member, which light-conducting element consists of a tube of transparent material, the parallel surfaces of which are totally reflecting against each other and the front end surface of which is matted.

4. In a view-finder for photographic apparatus, in combination, an opaque tubular casing, a negative objective arranged in said casing at one end of the same and forming the front opening at the view-finder, a positive ocular at the other end of said casing, a transparent mirror located in said casing behind the objective substantially at right angles to the axis of the view-finder, a tubular light-conducting element arranged longitudinally in said casing and extending from the objective to a point near the ocular, which tubular light-conducting element comprises parallel surfaces reflecting against each other, and a frame-shaped reflecting member located in the casing at said point near the ocular, which member consists of a frame of two reflecting surfaces, one extending substantially behind the tubular light-conducting element to receive the light from this element and direct it inwardly substantially in the transverse direction, the other extending inwardly from the first one in an angle to receive the light reflected from the first one and to direct it against the marginal portion of the transparent mirror.

5. In a view-finder for photographic apparatus, in combination, an opaque tubular casing, a negative objective arranged in said casing at one end of the same and forming the front opening of the view-finder, a positive ocular at the other end of said casing, a transparent mirror located in said casing behind the objective substantially at right angles to the axis of the view-finder, a tubular light-conducting element arranged longitudinally in said casing and extending from the front opening to a point near the ocular, which tubular light-conducting element comprises parallel surfaces reflecting against each other, and a frame of total-reflecting prisms of transparent material located in the casing at said point near the ocular, one of the two reflecting surfaces of said prisms extending substantially behind the tubular light-conducting element to receive the light from this element and direct it inwardly substantially in the transverse direction, the other of the two reflecting surfaces of said prisms extending inwardly from the first one in an angle to receive the light reflected from the first one and to direct it against the marginal portion of the transparent mirror.

6. In a view-finder for photographic apparatus, in combination, an opaque tubular casing, a negative objective arranged in said casing at one end of the same and forming the front opening of the view-finder, a positive ocular at the other end of said casing, a transparent mirror located in said casing behind the objective substantially at right angles to the axis of the view-finder, a tubular light-conducting element arranged longitudinally in said casing and extending from the front opening to a point near the ocular, which tubular light-conducting element comprises parallel surfaces reflecting against each other, a frame of total-reflecting prisms of transparent material located in the casing at said point near the ocular, one of the two reflecting surfaces of said prisms extending substantially behind the tubular light-conducting element to receive the light from this element and direct it inwardly substantially in the transverse direction, the other of the two reflecting surfaces of said prisms extending inwardly from the first one in an angle to receive the light reflected from the first one and to direct it against the marginal portion of the transparent mirror, and a non-transparent frame-shaped disc located behind the prism-frame.

7. In a view-finder for photographic apparatus, in combination, an opaque tubular casing, a negative objective arranged in said casing at one end of the same and forming the front opening of the view-finder, a positive ocular at the other end of said casing, a transparent mirror located in said casing behind the objective substantially at right angles to the axis of the view-finder, a light-conducting tube of transparent material, the parallel surfaces of which are total-reflecting against each other, which tube is arranged longitudinally in said casing and extends from the front opening to a point near the ocular, and a frame of total-reflecting prisms of transparent material located in the casing at said point near the ocular and made in one piece with said light-conducting tube, one of the two reflecting surfaces of said prisms extending substantially behind the light-conducting tube to receive the light from this tube and direct it inwardly substantially in the transverse direction, the other of the two reflecting surfaces of said prisms extending inwardly from the first one in an angle to receive the light reflected from the first one and to direct it against the marginal portion of the transparent mirror.

WALTER ZAPP.